(12) United States Patent
Lyons et al.

(10) Patent No.: US 12,512,732 B2
(45) Date of Patent: Dec. 30, 2025

(54) CURRENT MANAGEMENT AND TERMINATION

(71) Applicant: BAE Systems Controls Inc., Endicott, NY (US)

(72) Inventors: Arthur P. Lyons, Maine, NY (US); Stephen J. Kosteva, Endicott, NY (US); Cameron R. Vakili, Binghamton, NY (US); Nicholas A. Lemberg, Endwell, NY (US); Robert J. Vovos, Vestal, NY (US)

(73) Assignee: BAE Systems Controls Inc., Endicott, NY (US)

( * ) Notice: Subject to any disclaimer, the term of this patent is extended or adjusted under 35 U.S.C. 154(b) by 488 days.

(21) Appl. No.: 18/067,026

(22) Filed: Dec. 16, 2022

(65) Prior Publication Data

US 2024/0204624 A1   Jun. 20, 2024

(51) Int. Cl.
*H02K 11/33* (2016.01)
*H02K 5/22* (2006.01)

(52) U.S. Cl.
CPC ............. *H02K 11/33* (2016.01); *H02K 5/225* (2013.01)

(58) Field of Classification Search
CPC ..... H02K 11/33; H02K 5/225; H02K 11/0141
See application file for complete search history.

(56) References Cited

U.S. PATENT DOCUMENTS

| | | | |
|---|---|---|---|
| 2,844,801 A | 7/1958 | Sabaroff | |
| 2,973,490 A | 2/1961 | Schlicke | |
| 9,318,241 B2 | 4/2016 | Horan et al. | |
| 9,603,293 B2* | 3/2017 | Yagi | H05K 9/0064 |
| 10,644,588 B2 | 5/2020 | Werker et al. | |
| 11,251,693 B2 | 2/2022 | Rasek et al. | |
| 2003/0155874 A1* | 8/2003 | Schierling | H02P 5/74 |
| | | | 318/85 |
| 2009/0109713 A1 | 4/2009 | Schnetzka et al. | |
| 2011/0050135 A1 | 3/2011 | Higuchi et al. | |
| 2014/0035497 A1 | 2/2014 | Vrankovic et al. | |
| 2015/0003124 A1 | 1/2015 | Sakai et al. | |
| 2017/0194929 A1* | 7/2017 | Kochetov | B60L 1/00 |
| 2017/0200531 A1* | 7/2017 | Grupa | H01B 9/029 |
| 2018/0367025 A1 | 12/2018 | Rasek et al. | |

OTHER PUBLICATIONS

International Search Report, PCT/US23/82488, mailed May 1, 2024, 12 pages.

* cited by examiner

*Primary Examiner* — John W Poos
(74) *Attorney, Agent, or Firm* — Scully Scott Murphy & Presser PC; Gary McFaline

(57) ABSTRACT

A cabling system having a shielded cable for connecting an inverter and an electric machine is provided. The conductive shielding is connectable, either directly or indirectly, to the chassis of the inverter and the chassis of the electric machine such as indirectly, via a cable connector chassis. The cabling system further comprise high pass filter which comprises capacitance electrically connected to the conductive shielding configured to attenuated current less than a predetermined frequency from coupling to the conductive shielding. The attenuation is achieved via a frequency dependent current limiting impedance of the capacitance. The current less than the predetermined frequency is caused by torque producing current and/or flux modifying current. The cable connector chassis may comprise at least one high pass filter to connect serially with at least one cable inserted therein, respectively.

19 Claims, 15 Drawing Sheets

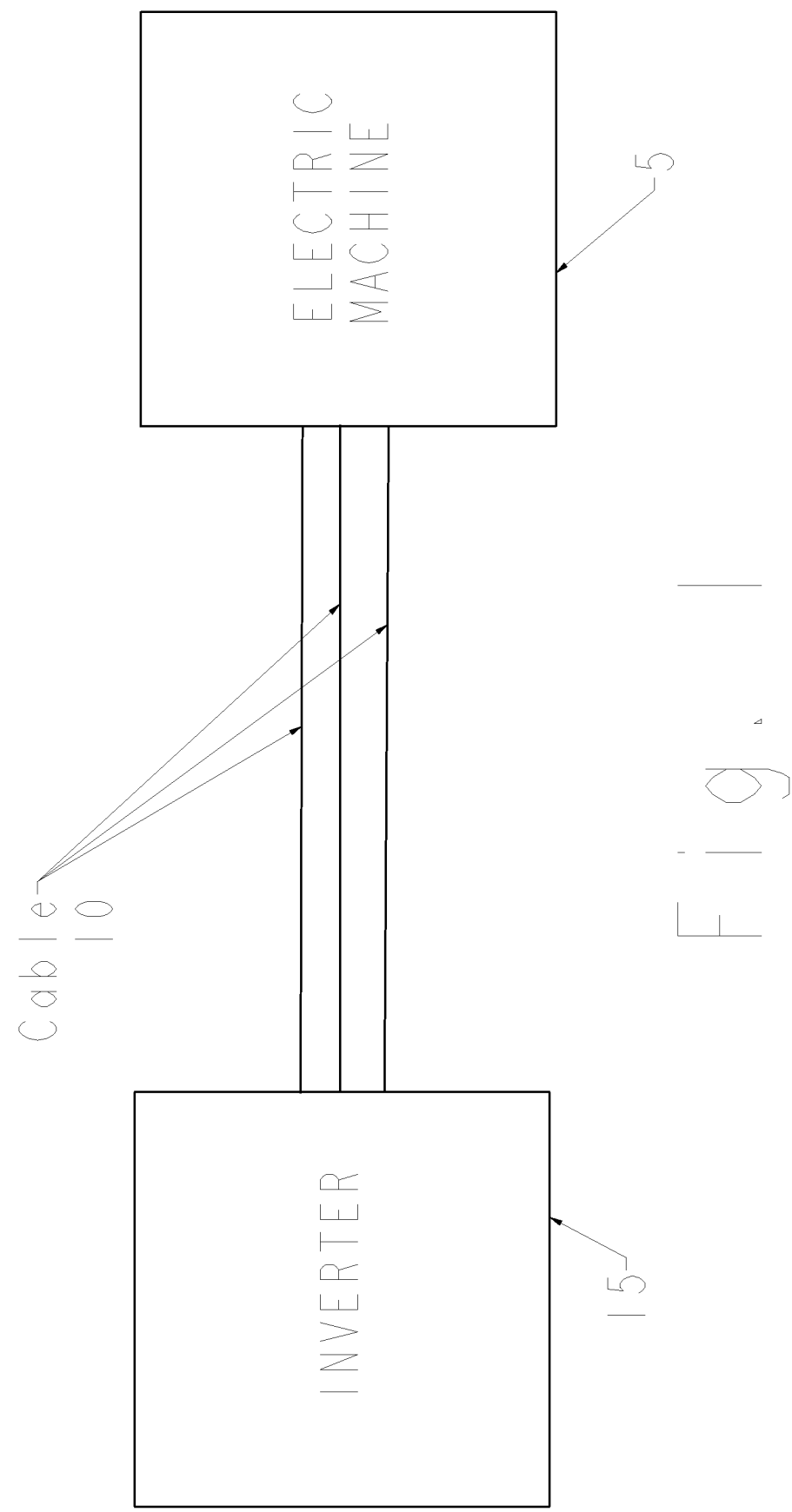

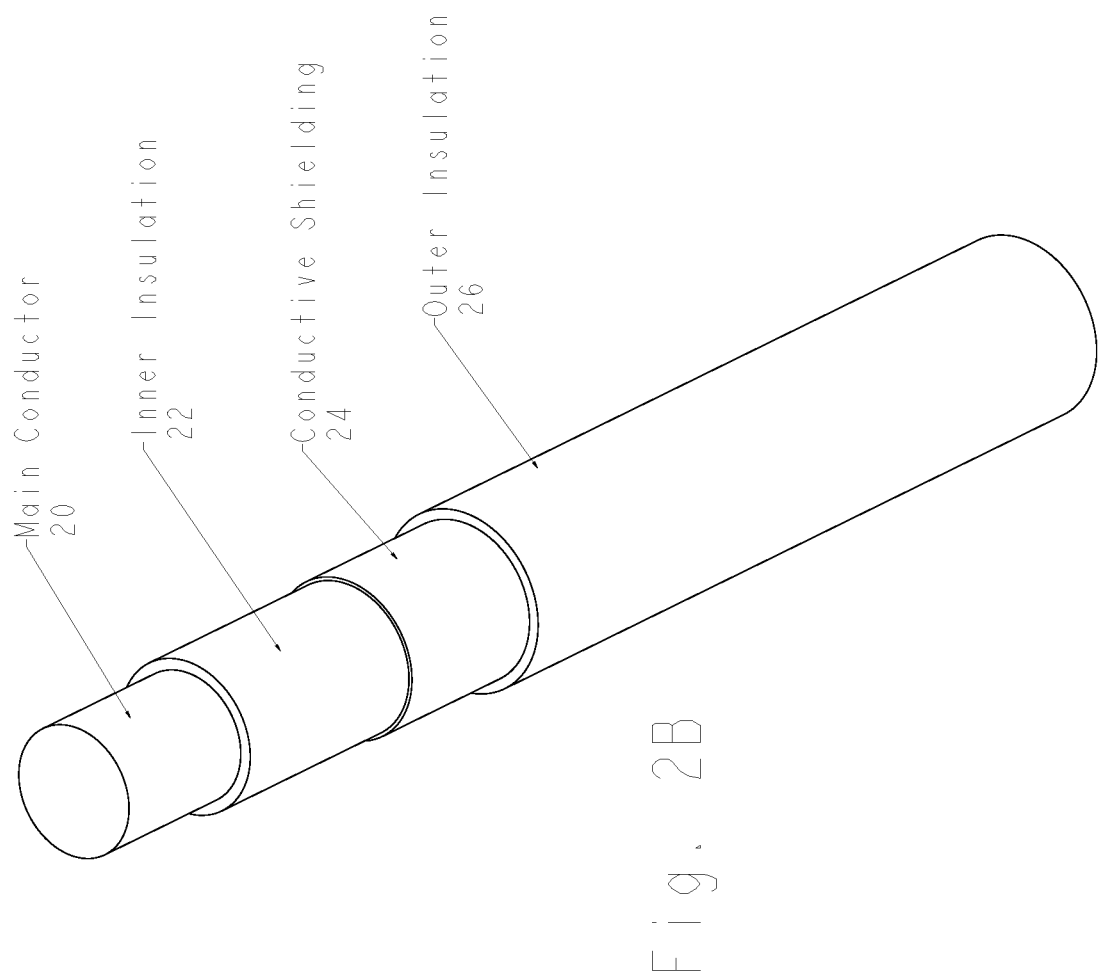

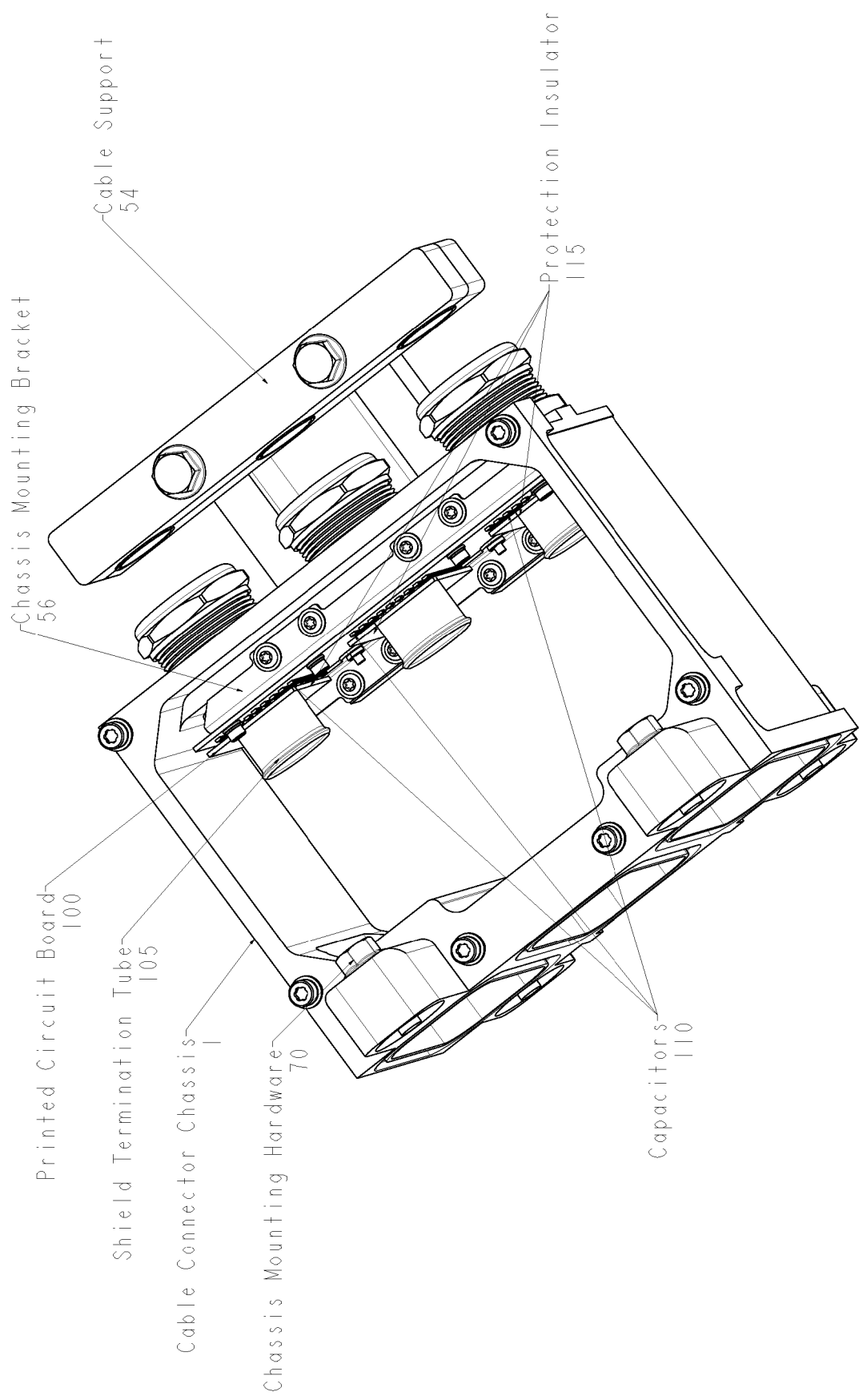

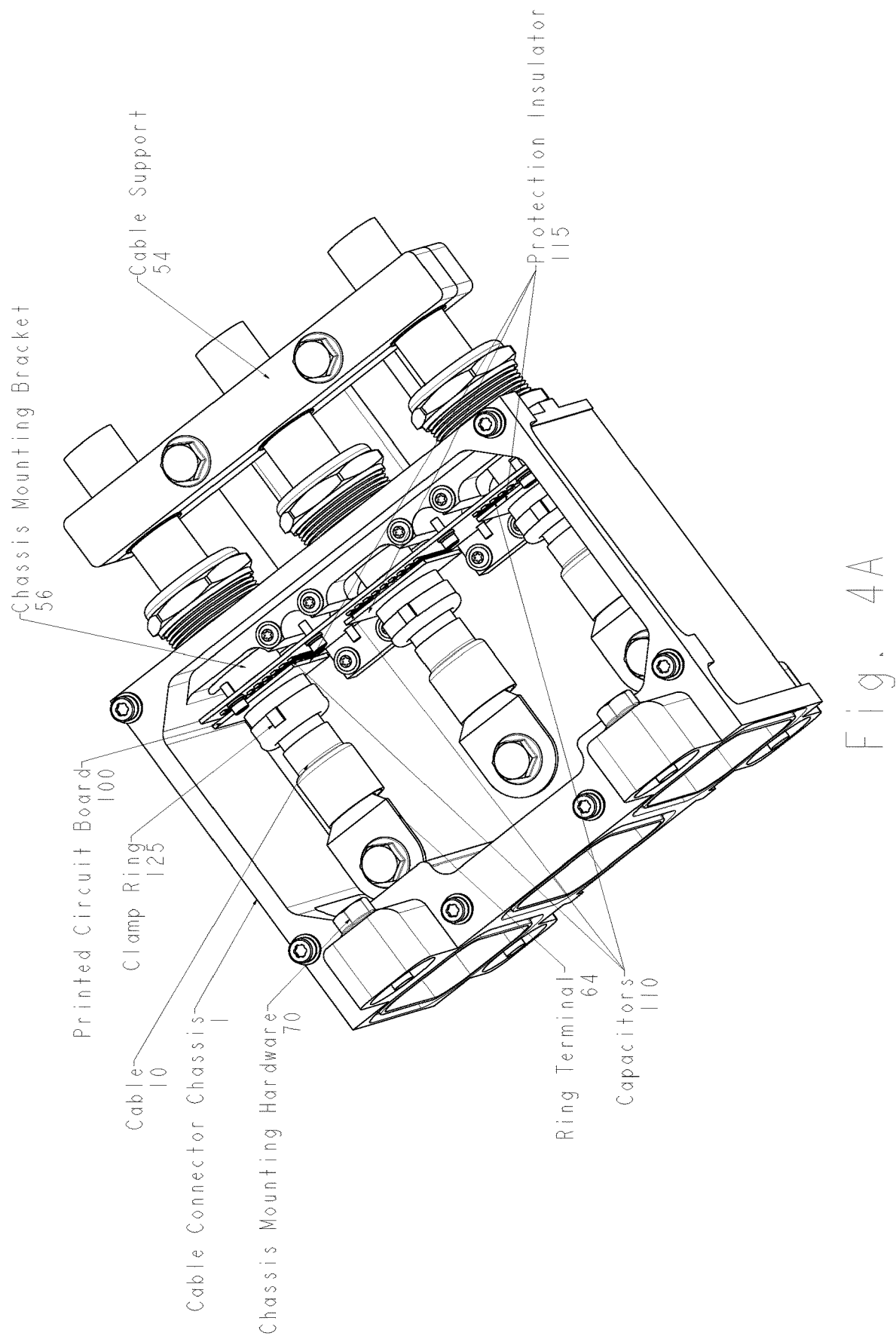

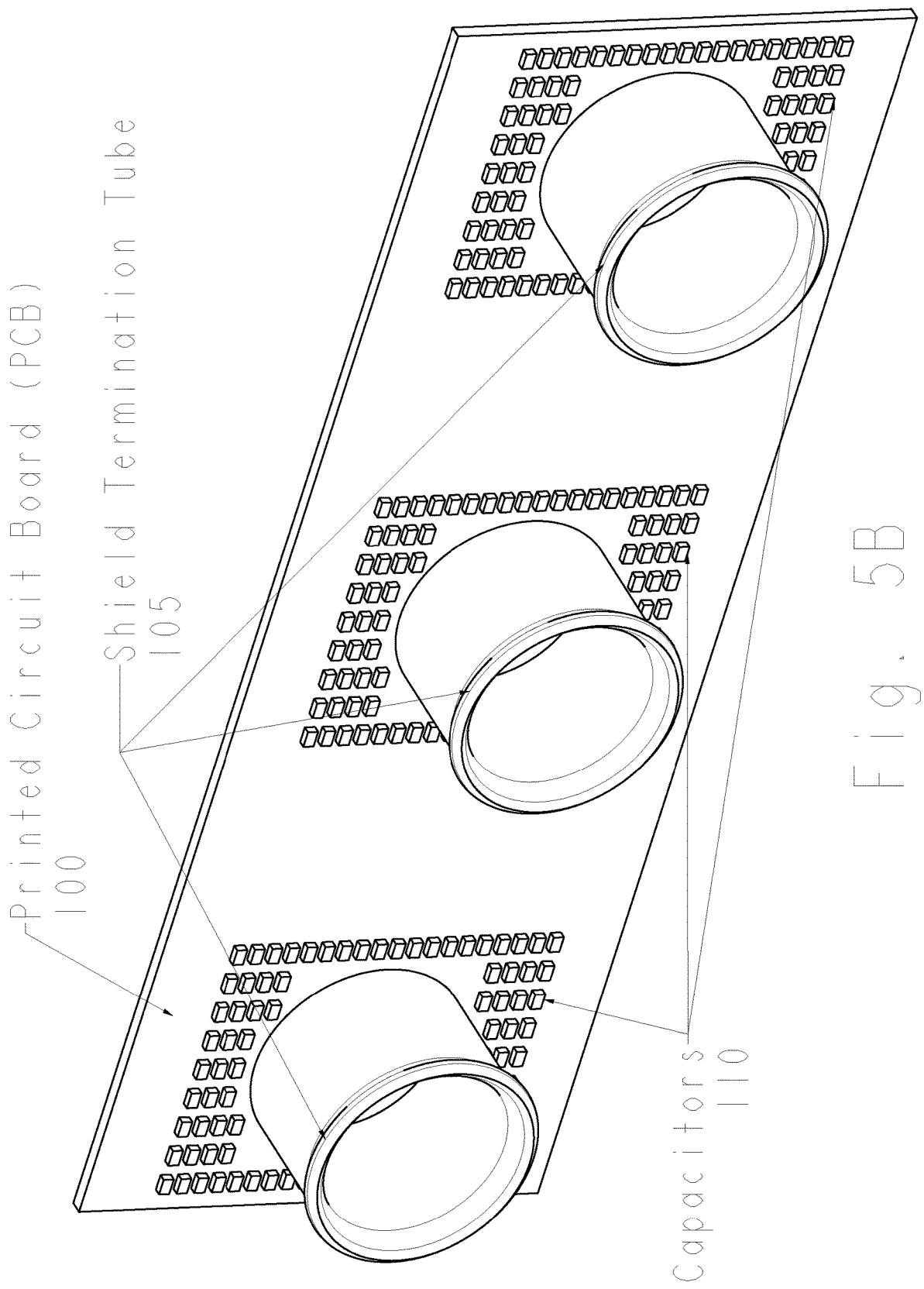

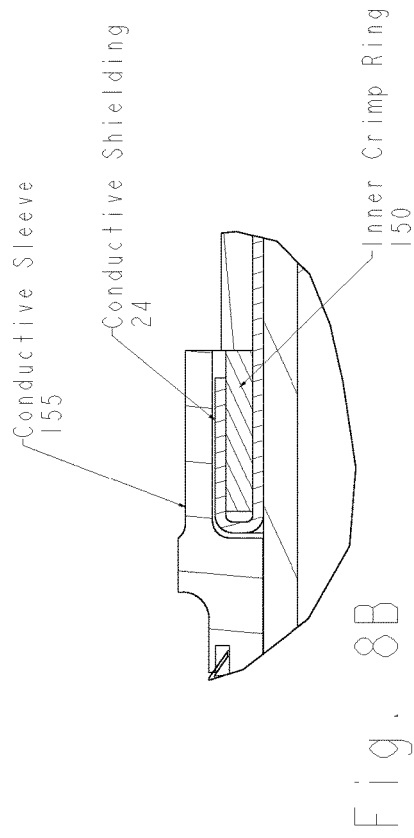
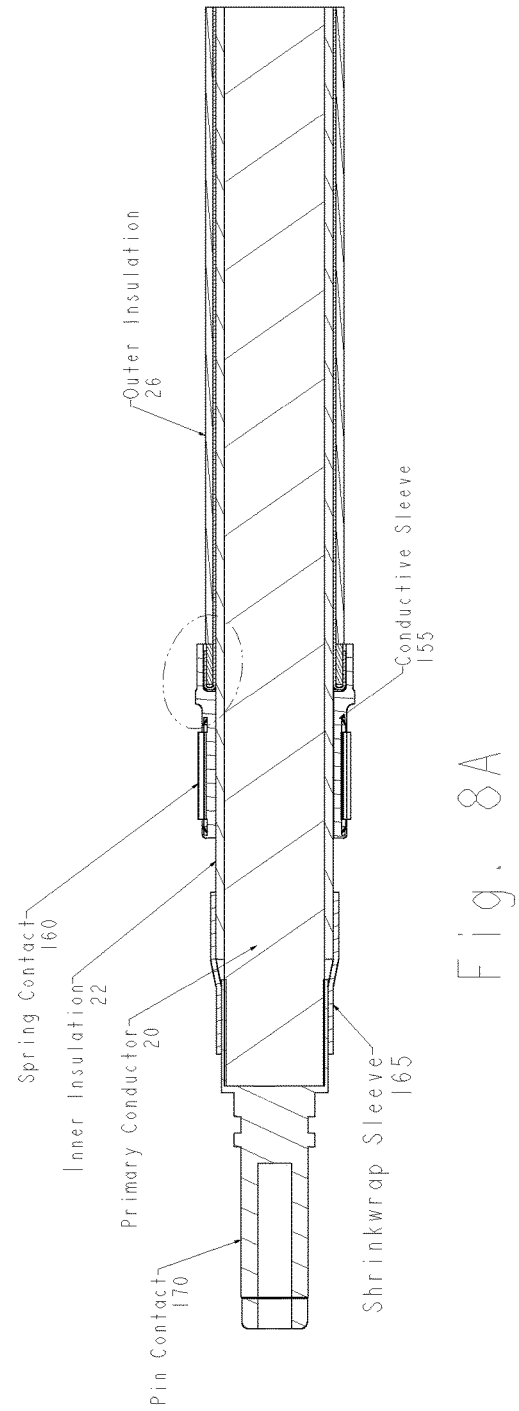

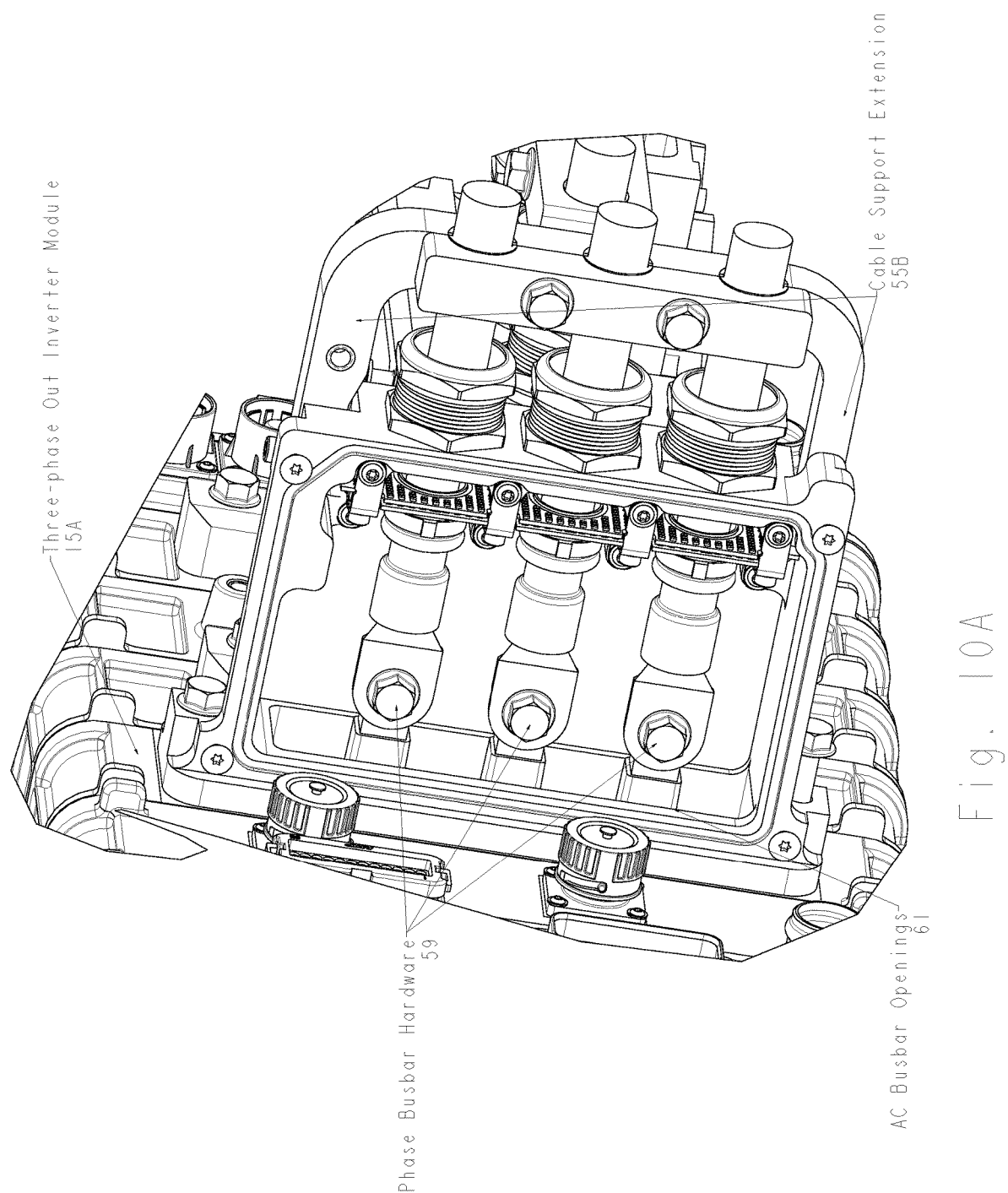

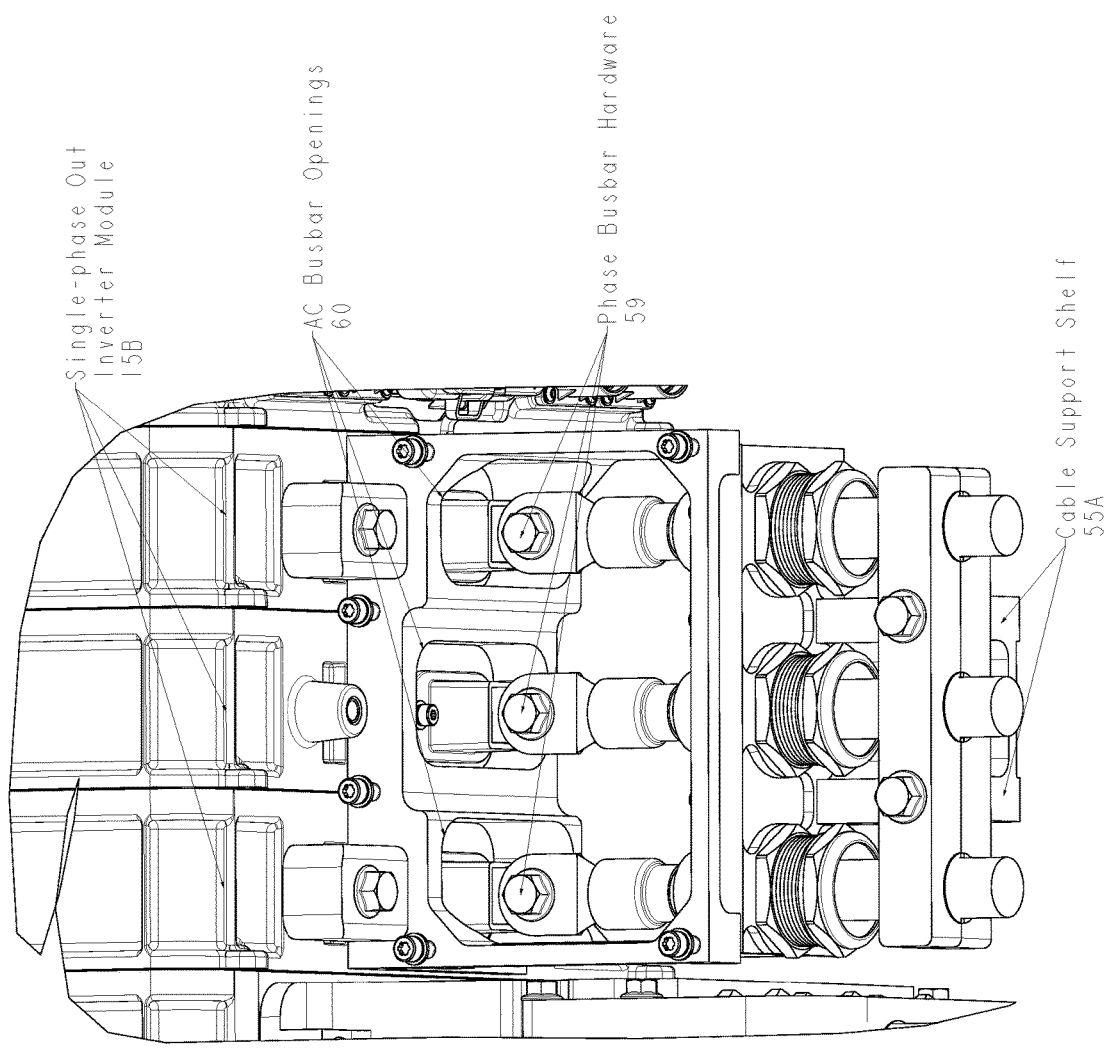

CURRENT MANAGEMENT AND TERMINATION

FIELD OF THE DISCLOSURE

This disclosure relates to power systems for high AC current application(s). More specifically, this disclosure relates to shielded power cables and filtering certain frequencies from coupling to the conductive shielding while enabling certain frequencies.

BACKGROUND

Cables are used to transport energy between the connected components such as an inverter and an electric machine such as differential voltage produced by semiconductor switches and torque producing current or flux modifying current. Torque is proportional to a magnitude of current. Power is proportional to torque and the rotational speed (frequency due to pole count). The AC power may be going from the inverter to the electric machine or vice versa. AC power may be transported in a main conductor of the cable. The main conductor is surrounded by an insulator. Depending on the application, the AC current in the main conductor may have high magnitudes. Additionally, depending on the application, the AC current in the main conductor may have a high frequency. For example, when the cable is used in a power system for a vehicle and the inverter uses semiconductor switches, the switching frequency may be over 10 kHz. As the use of wide bandgap semiconductors, such as silicon carbide (SiC) becomes more popular, the switch speed may be higher. Higher switching speeds, enable higher frequency sine waves to be induced in the machine windings of an electric machine.

An inverter generates a common mode voltage when applying differential voltage(s) to machine windings of an electric machine. The common mode voltage repeats at the switching frequency and induces a common mode current across the cable/stator winding inductance and the parasitic capacitance of the cable/stator to machine chassis. Thus, the frequency of the AC current within the main conductor of the cable contains both torque producing current and/or flux modifying current, which is low frequency current, as well as high frequency common mode current and its harmonics.

In certain known systems, to prevent the high frequency current from being transmitted to electronics outside of a desired path such as a component of a vehicle, like a display or a radio, etc. . . . , an outer conductor (conductive shielding) is connected either directly or indirectly to a chassis of the electric machine or the inverter. This provides a low impedance path for the high frequency current to travel.

However, since the conductive shielding is directly or indirectly, connected to the chassis, the torque producing current or flux modifying current flowing in the main conductor creates a magnetic field which couples to the conductive shielding as an air core transformer effect. This coupled current in the conductive shielding increases with magnitude of the AC current and frequency and can be a significant percentage of the main conductor current causing high losses in the conductive shielding and shield terminations. This ultimately limits the current carrying capability of the cable.

Additionally, the torque producing current or flux modifying current coupled to the conductive shielding causes heating of the cable and impacts the performance of the cable. For low power applications, the conductive shielding is often opened at one or both ends to prevent circulating current; however, this is not practical in a motor drive because in the absence of a low impedance conductive shielding, significant high frequency common mode currents would travel through the rest of the system (such as a vehicle) disrupting other electronics as discussed above.

As the switch frequency increases, such as by using the wide bandgap semiconductor switches, such as SiC switches, an increase in common mode current occurs. Each switching event generates a common mode edge which induces common mode current.

One way of reducing the amount of low frequency current flowing in the cable is to make the distance between the main conductor and the conductive shielding as small as possible or multiple cables packed close together to enable more of the magnetic fields to cancel. However, in practice, all of the magnetic fields will not cancel and the insulator between the main conductor and the conductive shield needs to be a certain thickness.

SUMMARY

Accordingly, disclosed is a cabling system comprising a cable connectable at a first end with an electric machine and an inverter at a second end. The cable has a conductor, a first insulator surrounding the conductor, a conductive shielding and a second insulator surrounding the conductive shielding. The conductor and the conductive shielding may be exposed at the first end and the second end. The conductive shielding is connectable to a chassis of the inverter and a chassis of the electric machine, either directly or indirectly. The cabling system further comprises a high pass filter which comprises capacitance electrically connected to the conductive shielding configured to attenuated current less than a predetermined frequency from coupling to the conductive shielding. The attenuation is achieved via a frequency dependent current limiting impedance of the capacitance.

In an aspect of the disclosure, the current less than the predetermined frequency is caused by torque producing current and/or flux modifying current.

In an aspect of the disclosure, the resonant frequency of the capacitance is greater than a frequency of a common mode current caused by switching of switches in the inverter and a first N harmonics where N is number of harmonics having an RMS greater than a preset amplitude.

In an aspect of the disclosure, the capacitance may be provided by a plurality of capacitors connected in parallel. In an aspect of the disclosure, the capacitance may be arranged symmetrically around the conductive shielding. In an aspect of the disclosure, the capacitance may be connected at one of the ends of the cable.

In an aspect of the disclosure, the frequency dependent current limiting impedance of the capacitance at the frequency of the common mode current and the first N harmonics is less than an impedance of any conductor that is in parallel to the conductive shielding.

Also disclosed is a cable connector chassis comprises at least one opening configured and dimensioned to receive a cable, respectively, a printed circuit board (PCB), and at least one shield termination tube. The cable has a conductor, a first insulator surrounding the conductor, a conductive shielding and a second insulator surrounding the conductive shielding. The conductor and the conductive shielding may be exposed at the first end and the second end. The PCB has at least one opening. Each circuit board opening may be aligned with a corresponding opening in the cable connector chassis. Each shield termination tube may be connected to the PCB and has an opening, also aligned with the circuit board opening and the opening in the cable connector chassis, respectively. The PCB may comprise at least one capacitor set. The capacitors in the set may be parallelly connected. The conductive shielding of the cable may be positioned to connect to a respective shield termination tube and electrically connect to a respective capacitor set forming a series connection. Each capacitor set forms a high pass filter configured to attenuated current less than a predetermined frequency from coupling to the conductive shielding. The attenuation is achieved via a frequency dependent current limiting impedance of the capacitor set.

In an aspect of the disclosure, the cable connector chassis may have multiple PCBs, each with an opening, a shield termination tube connected to the PCB and a capacitor set forming the high pass filter.

In an aspect of the disclosure, the PCB has three openings for three cables to be inserted. Each cable may be a single-phase cable. In this aspect of the disclosure, the PCB has three capacitor sets. Each capacitor set is respectively electrically connected to the conductive shielding of a respective cable.

In an aspect of the disclosure, the conductive shielding is folded back over a respective shield termination tube to connect the conductive shielding to the shield termination tube and electrically connect to the respective capacitor set. A clamp ring may be positioned around each conductive shielding to fix the conductive shielding in place.

In other aspects of the disclosure, the conductive shielding is electrically connected to a respective shield termination tube via one or more intermediary conductors. In an aspect of the disclosure, the conductive shielding is folded back over a crimp ring positioned between a respective conductive shielding and a respective second insulator, and a respective intermediary conductor is positioned on the respective conductive shielding and a respective contact spring is positioned on the respective intermediary conductor. The respective contact spring contacts an interior of the respective shield termination tube to make an electrical connection between the respective conductive shielding and the respective shield termination tube.

In an aspect of the disclosure, an insulation layer may be positioned between the conductive shielding and the PCB. In an aspect of the disclosure, the insulation layer may be an insulating elastomer such as a rubber.

In an aspect of the disclosure, the cable connector chassis further comprises mounts configured to receive mounting hardware for mounting the cable connector chassis to an inverter chassis or an electric machine chassis. When mounted, the conductor of each cable may connect within the cable connector chassis to a respective terminal of the inverter or the electric machine.

In an aspect of the disclosure, the cable connector chassis may connect to a plurality of single-phase out inverter modules. In other aspects, the cable connector chassis may connect to a three-phase out inverter module.

In an aspect of the disclosure, the resonant frequency of each capacitor set is greater than a frequency of a common mode current caused by switching of switches in the inverter and a first N harmonics, where N is number of harmonics having an RMS greater than a preset amplitude.

In an aspect of the disclosure, the capacitor in each set is arranged symmetrically around the respective conductive shielding.

In an aspect of the disclosure, current less than the predetermined frequency is caused by torque producing current and/or flux modifying current, where the frequency may be less than about 1000 Hz. In other aspects, the frequency may be less than about 2000 Hz.

BRIEF DESCRIPTION OF DRAWINGS

FIG. 1 illustrates a power system in accordance with aspects of the disclosure;

FIG. 2B illustrates a perspective view of the cable with the inner insulation cut to show the main conductor and the conductive shielding cut to show the inner insulation and the outer insulation cut to show the conductive shielding;

FIG. 3 illustrates a perspective view of an example of a cable connector chassis in accordance with aspects of the disclosure without the power cables;

FIG. 4A illustrates a perspective view of an example of a cable connector chassis in accordance with aspects of the disclosure with the power cables inserted;

FIG. 5B illustrates a perspective view of the printed circuit board illustrated in FIG. 5A in accordance with aspects of the disclosure;

FIG. 8A illustrates a sectional view of a cable in accordance with aspects of the disclosure and FIG. 8B illustrates a zoomed version of the cable in FIG. 8A showing a portion encircled by the dashed and dotted curve;

FIG. 10A illustrates an example cable connector chassis connected to a three-phase out inverter in accordance with aspects of the disclosure;

FIG. 10B illustrates an example cable connector chassis connected to three-single phase out inverters in accordance with aspects of the disclosure.

DETAILED DESCRIPTION

Figure 2A:
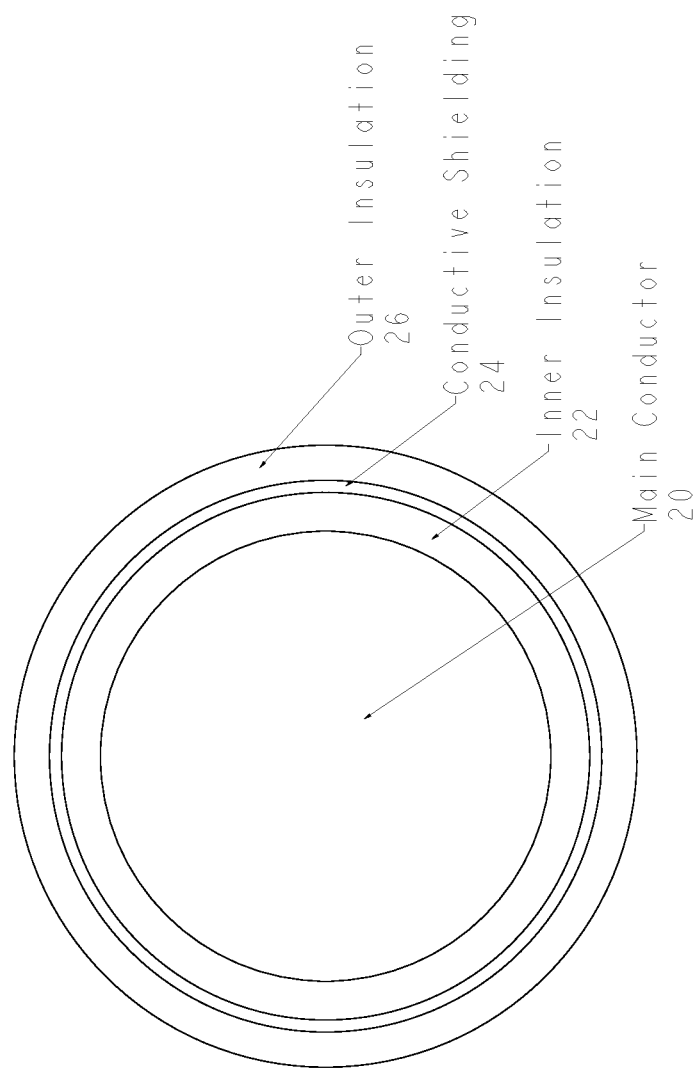
FIG. 2A illustrates a cross section of a power cable used in the power system in FIG. 1

Aspects of the disclosure provide a high pass filter having one or more capacitors 110. The high pass filter is connectable to the conductive shielding 24 of a cable 10 to attenuate current less than a frequency which prevents the current coupling to the conductive shielding 24. The frequency may be based on the frequency of torque producing current and/or flux modifying current as described herein. The one or more capacitors 110 have a frequency dependent impedance which provides current limiting impedance to current that may couple to the conductive shielding 24 as a result of the torque producing current and/or flux modifying current. The high pass filter also enables common mode current and its N number of harmonics (high frequency current) to flow within the conductive shielding 24. The one or more capacitors 110 have a low impedance to the common mode current and N number of harmonics at the respective frequencies.

FIG. 1 illustrates an example of a power system in accordance with aspects of the disclosure. The power system may be used in a vehicle. The vehicle may be a hybrid electric vehicle (HEV) or a battery electric vehicle (BEV). The vehicle may be a personal vehicle, such as a scooter, car, motorcycle and truck or a commercial vehicle such as a truck or bus, a maritime vehicle such as a boat or submarine or a military vehicle such as a tank, self-propelled artillery, or troop transport. The vehicle may also be an airplane, helicopter, UAV, and other powered air vehicles.

The power system may include one or more inverters 15, one or more electric machines 5 and one or more cables 10 connected to the inverter(s) 15 (on one end of the cable(s)) and the electric machine(s) 5 (on the other end). In some aspects of the disclosure, the electric machine 5 may be a synchronous or asynchronous electric machine.

As shown in FIG. 2A, the cable 10 has a main conductor 20. The main conductor 20 may be a plurality of twisted strands of a conductive material such as copper. The main conductor 20 is surrounded by an inner insulation 22. The cable 10 is a shielded cable and has a conductive shielding 24. The conductive shielding 24 may be made of a braided conductive material such as copper. The conductive shielding 24 is surrounded by an outer insulation 26. The main conductor 20 and the conductive shielding 24 may be exposed from the insulation 22, 26 at the end such as shown in FIG. 2B to enable connection as described herein (connection to terminals or busbars in the inverter 15 or electric machine 5 or to the capacitors 110).

An inverter 15 has one or more pairs of semiconductor switches. Each pair of semiconductor switches is connected in a H-bridge configuration between a positive DC rail and a negative DC rail of a DC bus. The number of pairs of semiconductor switches depends on the number of phases supported by the inverter 15. For example, for an inverter 15 supporting a single phase, there may be a single pair of switches. However, for an inverter 15 supporting three-phases, there may be three pairs of switches. Supporting used herein is different than outputting to an electric machine 5. Multiple phases may be independently output to an electric machine 5. In other aspects, the phases may be connected in parallel such that one output is supplied (one terminal).

The semiconductor switches may be transistors such as Insulated-gate bipolar transistors (IGBT) or field effect transistors (FETS). For example, the FETs may be wide bandgap semiconductor such as, but not limited to, silicon carbide (SiC) or gallium nitride (GaN). IGBTs have the capability for switching at about 20 kHz. SiC switches have the capability for switching up to 100 kHz and GaN switches have the capability for MHz+. The actual switching frequency of the semiconductor switches may be application specific and designed to achieve a target power.

The pairs of switches are controlled to produce a differential voltage which when the differential voltage is imposed on the electric machine 5 (such as the windings) creates a current which produces torque and/or modifies flux of the electric machine 5 (herein after "torque producing current" and "flux modifying current"). The torque producing current and/or flux modifying current is a sine wave with frequency equal to the rotor flux frequency and is related to rotational speed. In some aspects of the disclosure, the semiconductor switches may be controlled via field-oriented control, volts-hertz control or direct torque and flux controls. These controls may be classical controls regulating current considering speed or observer-based controls or other techniques for achieving torque and flux control. The specific control may be based on the type of electric machine. The higher switching frequency supports a higher frequency for the torque producing current or the flux modifying current. The torque producing current and/or flux modifying current has a low frequency relative to a common mode current. The specific frequency of the torque producing current and/or flux modifying current may depend on the type of electric machine and size. However, for most electric machines 5, the frequency of the torque producing current and/or flux modifying current is less than 1000 Hz. For some electric machines 5, the frequency of the torque producing current and/or flux modifying current may be less than 2000 Hz. The torque producing current and/or flux modifying current is transferred between the inverter 15 and the electric machine 5 via the main conductor 20.

The pairs of switches also generate a common mode voltage (and harmonics) when applying DC voltage(s) from the respective DC rails to machine windings in the electric machine 5 via the main conductor 20 of the cable 10. This common mode voltage repeats at the switching frequency and induces a common mode current across the main conductor 20/stator winding inductance and the parasitic capacitance of the main conductor 20/stator to chassis of the electric machine 5.

The specific frequency of the common mode current depends on the length of the cable 10 (inductance and parasitic capacitance) and the type of electric machine (inductance and parasitic capacitance). The common mode current repeats at the switching frequency of the pairs of semiconductor switches. The specific frequency of the common mode current may be orders of magnitude higher than the frequency of the torque producing current and the flux modifying current. For example, the common mode current and its primary N harmonics may have frequencies 100 kHz-100 Mhz. N is the number of harmonics that have an RMS current above a preset threshold. Specifically, the preset threshold is based on the total RMS of the current and set such that the common mode current and the N number of harmonics is most of the total high frequency current (e.g., greater than 97% or 98% or 99%).

The impedance of a capacitor is determined by $$Z_c = -j\frac{1}{\omega C}.$$

The capacitance of the one or more capacitors 110 may be set such that the one or more capacitors 110 have a high impedance below 1000 Hz (or 2000 Hz). Additionally, the capacitance of the one or more capacitors 110 may be set such that the one or more capacitors 110 have a low impedance at the frequencies of the common mode current and its primary N harmonics, such as 100 kHz-100 Mhz. In accordance with aspects of the disclosure, the capacitance of the one or more capacitors 110 may also be set such that the one or more capacitors 110 has an impedance at the frequencies of the common mode current and its primary N harmonics less than any conductor that is in parallel to the conductive shielding 24.

For example, a safety ground wire may connect the chassis of the inverter and the chassis of the electric machine. This safety ground wire has an impedance based on its length. In an aspect of the disclosure, a preset maximum length cable is set in advance and the impedance of the maximum length is determined. Based on the determined impedance for the safe ground wire, the impedance of the one or more capacitors 110 at the frequencies of the common mode current and its primary N harmonics may be set to be lower than the impedance at the same frequency of the safety ground wire. In some aspects of the disclosure, the capacitor(s) impedance at the frequencies may be an order of magnitude less for margin.

Similarly, other impedance paths of any path that is parallel to the conductive shielding 24 may be determined or estimated. For example, the impedance of the chassis of the inverter and the chassis of the electric machine may be known. Based on this impedance (estimated or actual), the impedance of the one or more capacitors 110 at the frequencies of the common mode current and its primary N harmonics may be set to be lower than the impedance at the same frequency of chassis of the inverter/electric machine (other alternative paths). In some aspects of the disclosure, the impedance of the chassis (of the electric machine) may be estimated based on worst case and the impedance of the capacitor(s) set based on the worst-case estimate (lower).

Since current will flow toward a path of least resistance (lowest impedance), in order to have the common mode current and its primary N harmonics flow in the conductive shielding 24 of the cable 10, the impedance must be less than alternative paths.

The value of the capacitance for the high pass filter may vary depending on the length of the cable 10 and the type of electric machine. However, in an aspect of the disclosure, the value may be set based on a predefined maximum cable length between the inverter 15 and the electric machine 5.

Capacitors 110 also have a parasitic inductance causing a parasitic impedance. The parasitic impedance increases as the frequency increases. At higher frequencies, the parasitic inductance and capacitance form a resonance (resonant frequency). The resonant frequency is defined as:

$$fr = \frac{1}{2\pi\sqrt{LC}}$$

In accordance with aspects of the disclosure, the resonant frequency of the capacitors 110 is set to be higher than the common mode current and primary N harmonics so that these currents return in the conductive shield 24 and not in an alternate path to the rest of the system (vehicle).

To increase the resonant frequency and maintain a low impedance at the frequencies of the common mode current and its primary harmonics, in accordance with aspects of the disclosure, multiple capacitors may be connected in parallel to lower the total parasitic inductance because parallel inductances divide. Lowering the parasitic inductance increases the resonant frequency for the same capacitance. For example, $L_{total}=L_{each}/N$, where $L_{each}$ is the parasitic inductance per capacitor, N is the number of capacitors and $L_{total}$ is the total inductance.

The capacitance of multiple capacitors 110 multiply. For example, $C_{total}=C_{each}*N$, where $C_{each}$ is the capacitance of each capacitor and N is the number of capacitors and $C_{total}$ is the total capacitance of the circuit. In some aspects of the disclosure, the total capacitance may be between about 100 nF and about 10 µF. In some aspects of the disclosure, the total capacitance may be between about 500 nF and about 1.5 µF. For example, the total capacitance may be about 1 µF.

In an aspect of the disclosure, the number of capacitors 110 may also be based on the amplitude of the common mode current (and harmonics). In some aspects of the disclosure, the RMS of the common mode current may be between about 1 A RMS to tens of amps RMS and the peaks may be between tens of amps and hundreds of amps based on the output of the electric machine between about 10 kW and about 1 MW. For example, the RMS may be about 10 A and the peaks may be about 100 A. In some aspects of the disclosure, the number of capacitors may be between 2-200 capacitors. Additionally, in some aspects of the disclosure, the capacitance of each capacitor may be the same. However, in other aspects, a single capacitor may be used.

In an aspect of the disclosure, the capacitor(s) 110 may be connected in series between the conductive shielding 24 and one or both chassis of the inverter and/or electric machine. For example, the capacitor(s) 110 may be integrated into a cable connector chassis 1 at the terminus of the cable 10. In other aspects of the disclosure, the capacitor(s) 110 may be connected in series between portions of the conductive shielding 24.

FIG. 3 illustrates an example of a cable connector chassis 1 in accordance with aspects of the disclosure. In FIG. 3, the cables 10 are not inserted. The cable connector chassis 1 may be connected to either a chassis of an inverter 15 (inverter module 15A or 15B) or a chassis of the electric machine 5 using chassis mounting hardware 70. The chassis mounting hardware 70 may be inserted into hollow protrusions from the chassis 1 (e.g., mounts). As illustrated in FIG. 3, the mounts have a rectangular shape (with a central opening for the chassis mounting hardware 70).

The cable connector chassis 1 has at least one cable opening. Each cable opening is configured and dimensioned to receive the cable 10 (and cable strain relief with sealing gland as will be described later). FIG. 4A illustrates cables 10 inserted into respective openings. In FIG. 3 and FIG. 4A, there are three openings for three cables. However, the number of openings and cables is not limited to three and may be based on the application and system design.

Figure 4B:
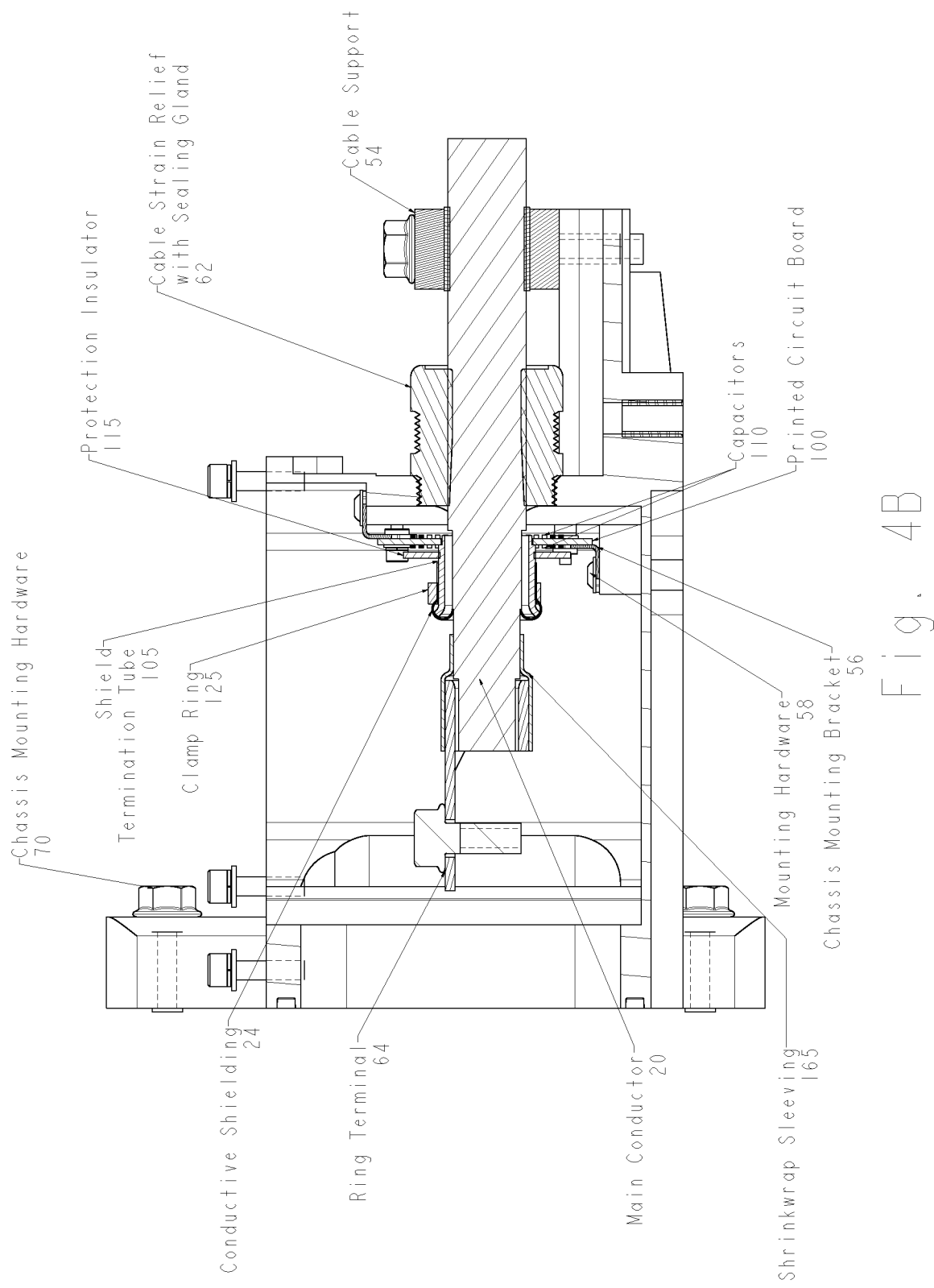
FIG. 4B illustrates a sectional view of the example of a cable connector chassis in accordance with aspects of the disclosure with the power cables inserted.
Figure 5A:
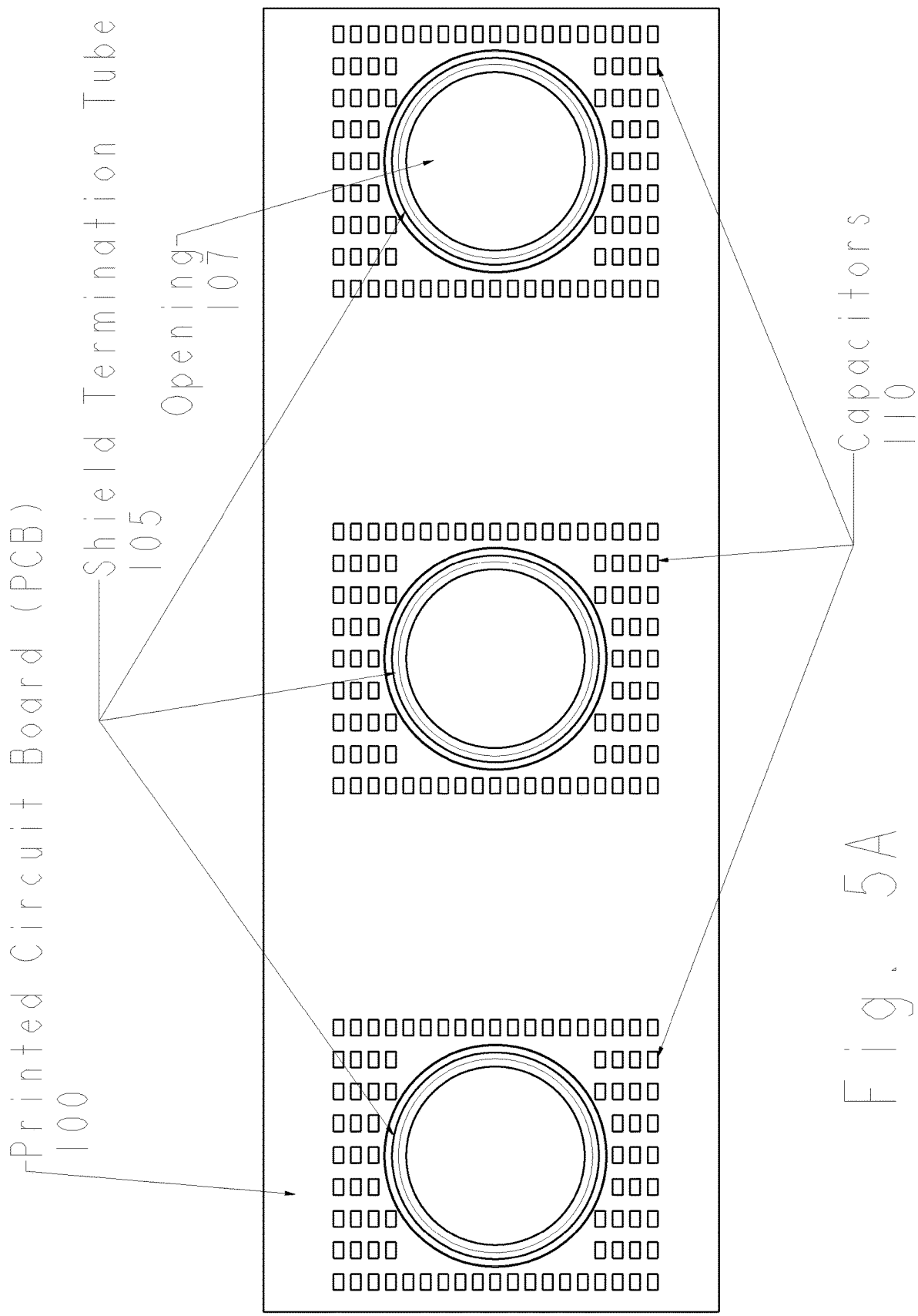
FIG. 5A illustrates a planar view of an example of a printed circuit board with high pass filters for attenuating AC current below a threshold from coupling to a conductive shielding in accordance with aspects of the disclosure.

The cable connector chassis 1 has a printed circuit board (PCB) 100. The PCB may be attached to the chassis 1 via chassis mounting bracket(s) 56 as illustrated in FIG. 3. For example, one mounting bracket 56 may be attached to the top of the PCB 100 and another mounted bracket 56 may be attached to the bottom of the PCB 100. The chassis mounting brackets 56 may be connected to the cable connector chassis 1 via mounting hardware 58 to secure the PCB 100 to the cable connector chassis 1. In the figures, each bracket 56 is attached using 4 mounting hardware such as a bolt and a washer. An example of the PCB 100 is illustrated in FIG. 5A and FIG. 5B. The PCB 100 has at least one opening 107 corresponding to the opening in the cable connector chassis 1. As shown in FIGS. 5A and 5B, the PCB 100 has three openings to match the number of cable openings. The openings 107 in the PCB 100 align with the cable openings in the chassis 1 as shown in FIG. 4B. This alignment enables the cables to be inserted into the chassis 1 and the PCB 100. Each opening 107 of the PCB 100 is surrounded by shield termination tube 105, respective. The shield termination tube 105 is made of a conductive material. The conductive material may be copper. In some aspects of the disclosure, the copper may be plated with another material such as tin and lead. In other aspects, the conductive material may be aluminum or another conductive material with a low impedance.

Figure 7:
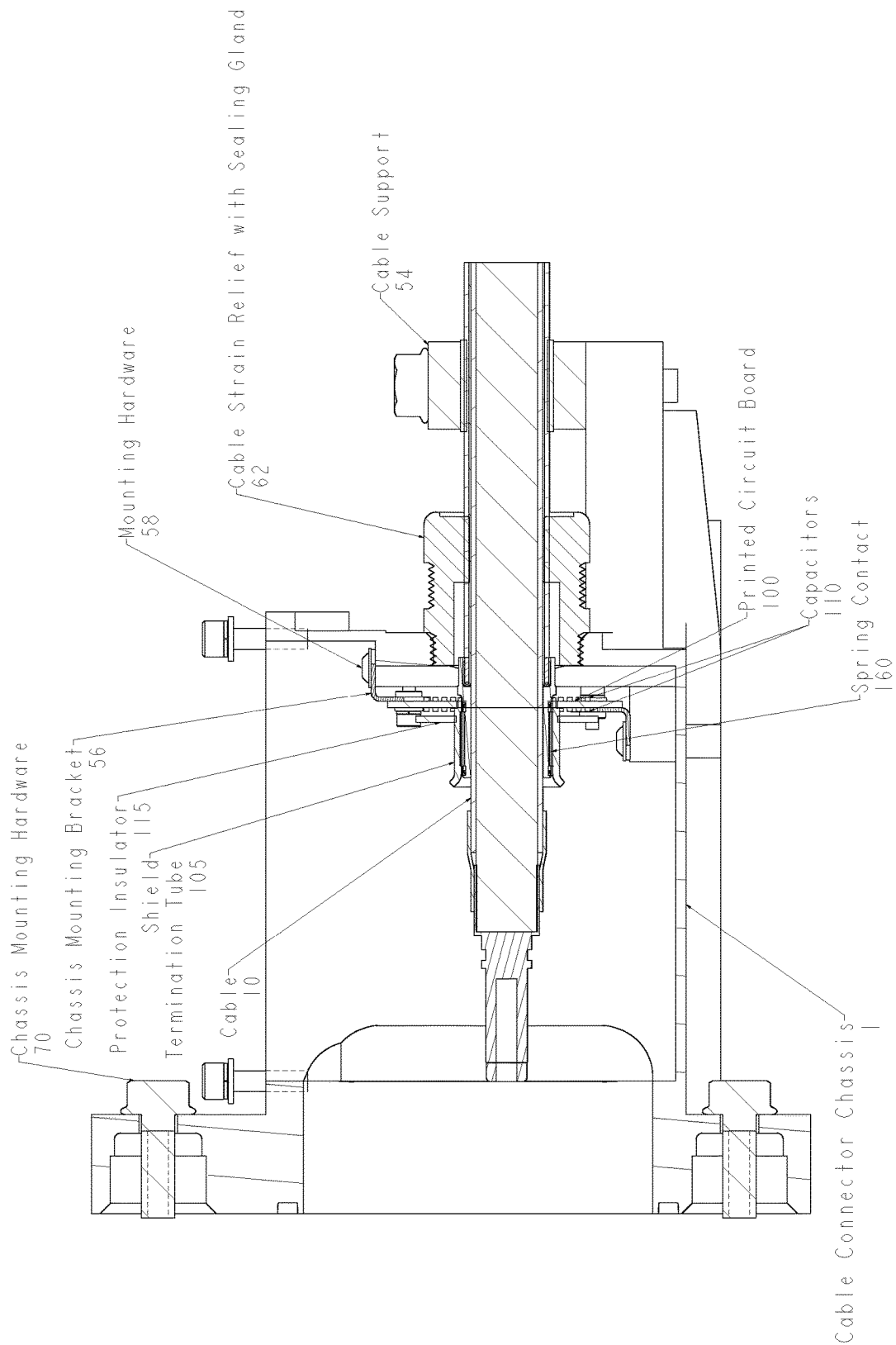
FIG. 7 illustrates a sectional view of the example illustrated in FIG. 6.

The shield termination tube 105 protrudes inward from the PCB 100 (when mounted to the chassis 1). The shield termination tube 105 may be mounted to the PCB 100 via a Plated through hole of the PCB 100. An external surface of the shield termination tube 105 is soldered to the Plated through hole. The connection end of the shield termination tube 105 has a notched section (where the wall is thinner) for the soldering and the shoulder of the notch sits on the surface of the PCB 100 to prevent movement (slippage) as shown in FIGS. 4B and 7. The shield termination tube 105 is hollow also to enable a respective cable to be inserted.

The other end (opposite to the connection end for the PCB 100) may have a flare to prevent the clamp ring 125 from sliding as shown in FIGS. 4B and 7.

As illustrated in FIGS. 5A and 5B, the PCB 100 has three openings and three shield termination tubes 105, respectively, to match the number of cable openings in the cable connector chassis 1. In an aspect of the disclosure, each shield termination tube 105 is surrounded by the high pass filter described above. Specifically, a plurality of capacitors 110 may surround the shield termination tube 105. The capacitors 110 may be surface mounted capacitors in the PCB 100. The number of capacitors around each shield termination tube in FIGS. 5A and 5B are for descriptive purposed only and a different number of capacitors may be used.

As shown in the example in FIGS. 5A and 5B, the capacitors 110 are symmetrically arranged around the shield termination tube 105. This is because when the cables 10 are electrically connected to the capacitors 110, the impedance around the conductive shielding 24 may be substantially equal around the circumference of the cable 10 using the symmetrical arrangement. Therefore, current will flow substantially equally around the conductive shielding 24. If the capacitance was positioned only on one side of the shield termination tube 105 (and cable), then the current will be imbalanced due to an imbalanced impedance and the portion subjected to the higher flow may overheat. However, while symmetry may be preferred, in some aspects of the disclosure, the capacitors may be positioned substantially symmetric, but allowing for mounting hardware, brackets and openings for mounting the PCB 100 to the cable connector chassis 1.

In other aspects of the disclosure, when a single capacitor may be used to provide the capacitance, the single capacitor may not be symmetric about the shield termination tube 105 and conductive shielding 24.

In some aspects of the disclosure, the capacitors 110 may be covered by a protection insulator 115 (an example of an insulation layer). The protection insulation 115 may be an insulating elastomer such as a silicone rubber. Silicone has a high temperature rating. The thickness of the insulating elastomer may be between about 0.5 mm and about 2.0 mm. The diameter may be undersized to the diameter of the shield termination tube 105 for a friction fit as shown in FIGS. 4B and 7. The elastomer may have a high coefficient of friction. The protection insulation 115 is stretched over the shield termination tube 105 and slide down the same until its flush with the PCB 100. The friction between the protection insulation 115 and the shield termination tube 105 maintains the insulation 115 in position. In other aspects, the protection insulation 115 may be affixed to the PCB 100 via an insulating epoxy. Other solid elastomers (solid rubbers) may be used such as Nitrile, Styrene-butadiene (SBR) and Fluorocarbon-based fluoroelastomer (FKM).

The protection insulation 115 is configured to protect the PCB 100 and capacitors 110 from being damaged by strands of the woven conductive shielding 24 when the cable 10 is fully inserted and conductive shielding 24 is folded back on the shield termination tube 105 as will be described later.

In some aspects of the disclosure, instead of a single PCB 100 for the cables 10, there may be multiple PCBs 100 with high pass filters, one per cable.

Figure 11:
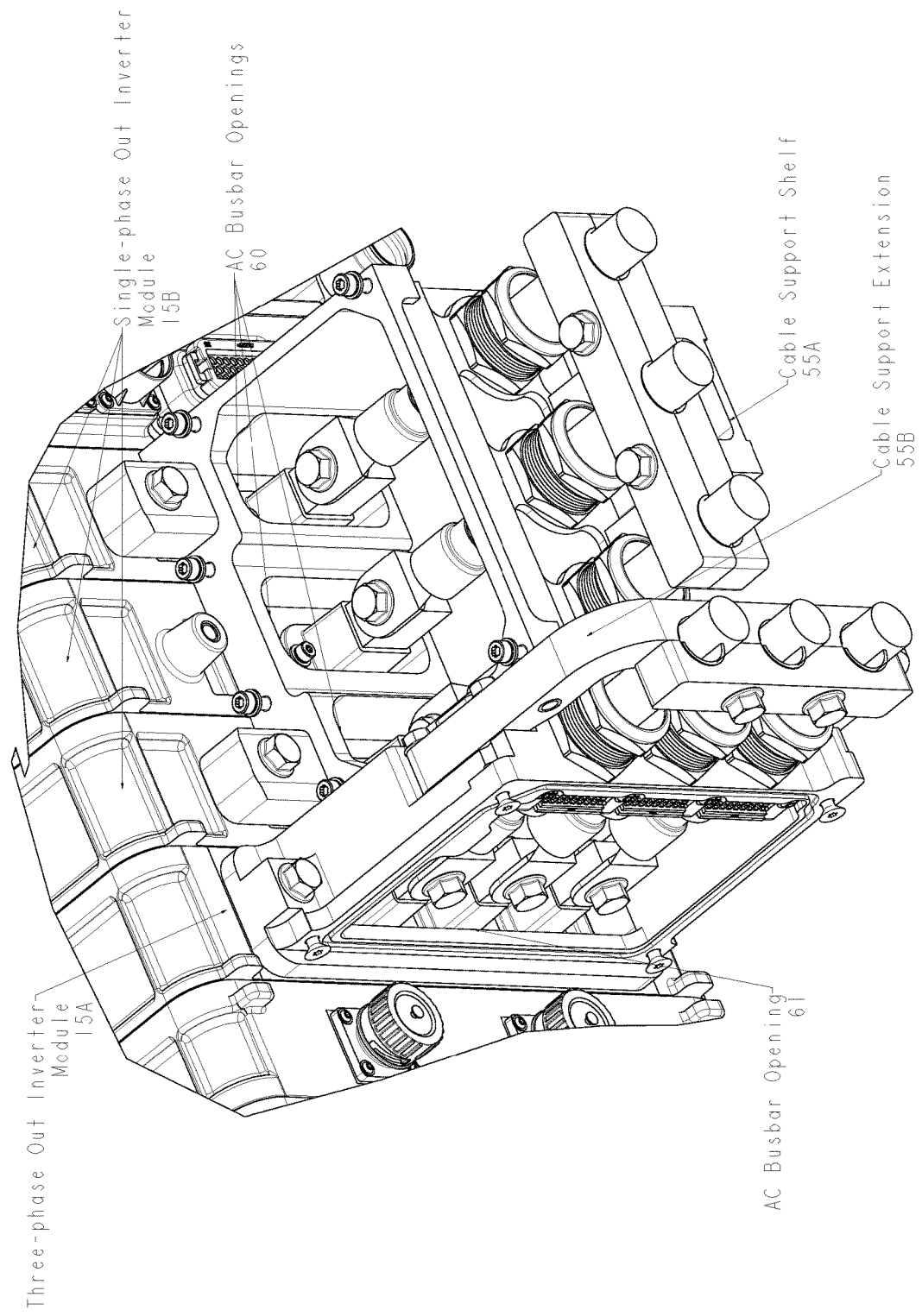
FIG. 11 illustrates an example of two cable connector chassis connected to inverter modules in accordance with aspects of the disclosure.

The cable connector chassis 1 may also have a cable support 54 in front of the main body of the chassis 1. The cable support 54 comprises the same number of openings as cables 10 connected to the cable connector chassis 1. The cable support 54 is mounted a preset distance from a wall of the chassis 1 to provide support for the inserted cable. The wall of the chassis 1 may have a cable support shelf 55A projecting from the front wall and below the cable support 54. The cable support 54 may sit on the cable support shelf 55A as shown in FIGS. 10B and 11. The cable support shelf 55A may project from the front wall for cable connector chassis 1 when used to connect to the single-phase out inverter module 15B. In other aspects, the cable support 54 has an extension 55B which projects to the cable connector chassis 1 and mounts to a side wall of the cable connector chassis 1. The side wall may have a chassis recess or notch to receive the extension 55B as shown in FIGS. 10A and 11.

FIGS. 4A and 4B illustrate cables 10 inserted into the cable connector chassis 1 (where FIG. 4A is a perspective view and FIG. 4B is a sectional view). A cable strain relief assembly (with sealing gland 62) is installed around the cable 10 and inserted into the openings in the cable connector chassis 1. The assembly 62 has cord grip with a domed end cap, a feedthrough (e.g., hex) and a hex dome cap. The assembly 62 is positioned around the cable 10. The hex feedthrough is positioned in the opening and lodges in the wall of the chassis. The cord grip and domed end cap act as a seal.

For insertion, the end of the cable 10 is stripped of the insulations 22, 26, such as shown in FIG. 2B to expose the main conductor 20 and conductive shielding 24.

The cable 10 has a terminal for connecting to a terminal of the inverter (such as an AC busbar) or of the electric machine. The terminal of the cable 10 may be a ring terminal 64. The ring terminal 64 is attached to the main conductor 20. In some aspects of the ring terminal 64 may be attached by crimping after the cable 10 is feed into the cable connector chassis 1. As shown in FIG. 4B, the ring terminal 64 is parallel to the top/bottom of the cable connector chassis 1. The ring terminal 64 has an opening for insertion of mounting hardware to electrically and mechanically connect the cable 10 to the terminal (AC busbar) of the inverter or electric machine.

The ring terminal 64 and the main conductor 20 may be covered by shrinkwrap sleeving 165 around the point of connection. The shrinkwrap sleeving 165 may extend the circumference of the main conductor 20. In an aspect of the disclosure, the shrinkwrap sleeving 165 may be made of an insulating material for environmental protection such as moisture and contaminants and preventing electrical shorts.

In an aspect of the disclosure, the exposed conductive shielding 24 may be folded back over the exterior of the shield termination tube 105 (overbraid) to create the electrical connection to the capacitors 110 on the PCB 100. In an aspect of the disclosure, the folded back exposed conductive shielding 24 contacts the shield termination tube 105 but the strands do not physical contact the PCB 100. A clamp ring 125 may positioned over the folded back exposed conductive shielding 24 to fix the position of the same on the shield termination tube 105 (using a clamp ring tool). In some aspects of the disclosure, the clamp ring 125 is positioned mid-way of the height of the shield termination tube 105.

A series connection is formed between the capacitance (capacitors 110) on the PCB 100, the shield termination tube 105 and the conductive shielding 24 (and the cable connector chassis 1).

FIG. 4B illustrates the conductive shielding 24 folded back on the exterior of shield termination tube 105 and the protective insultation 115 being between the conductive shielding 24 and the PCB 100 with the capacitors 110 (FIG. 4B shows a gap between the folded back exposed conductive shielding and the protective insulation 115).

The cable connector chassis 1 also has AC busbar opening 60/61 (as shown in FIGS. 10A, 10B and 11). The AC busbar openings 60/61 are dimensioned to allow for clearance for an AC busbar of either an inverter 15 or an electric machine 5. As described later, the size and shape of the opening 60/61 may depend on the inverter module 15A or 15B being connected to or the type of electric machine.

In accordance with the above aspects, the electrical connection between the conductive shielding 24 and the capacitors 110 is made by folding the conductive shielding 124 over the exterior of the shield termination tube 105, however in other aspects, the electrical connection between the conductive shielding 24 and the capacitors 110 may be via the interior surface of the shield termination tube 105.

Figure 6:
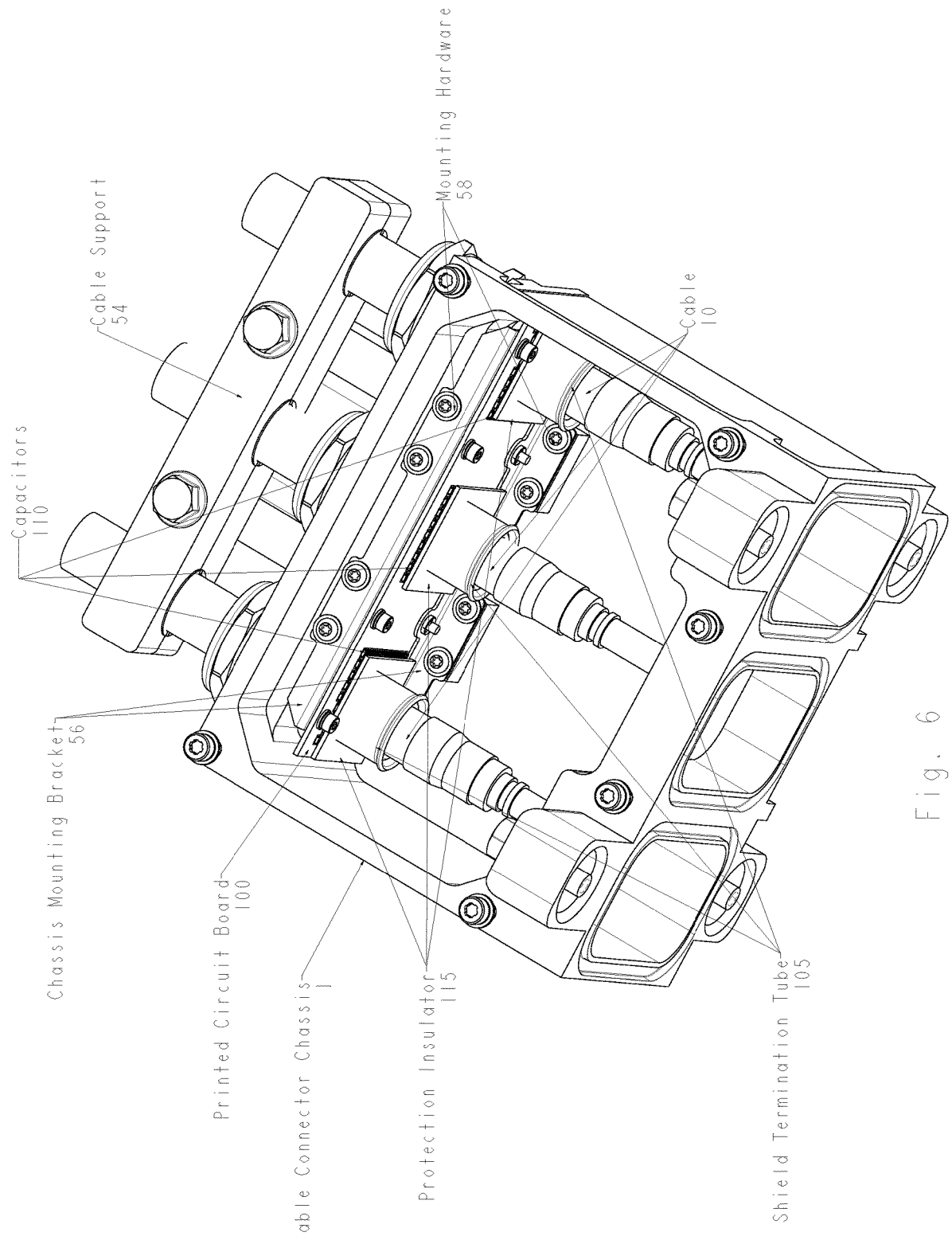
FIG. 6 illustrates a perspective view of another example of cables inserted into a cable connector chassis in accordance with aspects of the disclosure.

FIGS. 6 and 7 illustrate another example of cables 10 inserted into a cable connector chassis 1 in accordance with aspects of the disclosure. In this example, the electrical connection between the conductive shielding 24 and the capacitors 110 is made via an interior surface of the shield termination tube 105.

An example cable 10 in accordance with aspects of the disclosure is illustrated in FIGS. 8A and 8B. The conductive shielding 24 is folded over an inner crimp ring 150 as shown in FIG. 8B (a zoomed view of the cable 10 illustrated in FIG. 8A showing the portion in the dotted and dashed curve). The inner crimp ring 150 may be made of the same material as the conductive sleeve 155 as described below. The inner crimp ring 150 may be positioned around the cable 10 where the outer insulation 26 has been removed. The inner crimp ring 150 may have the same thickness as the outer insulation 26. After the conductive shielding 24 is folded back over the inner crimp ring 150, the conductive shielding 24 is in contact with the three surfaces of the inner crimp ring 150. A conductive sleeve 155 is also positioned around the cable 10. The conductive sleeve 155 has a crimping portion. The crimping portion of the conductive sleeve is positioned on the folded over conductive shielding 24. The conductive shielding 24 is sandwiched between the inner crimp ring 150 and the crimping portion of the conductive sleeve. The conductive sleeve 155 has another portion surrounding the inner insulation 22. The another portion may have a thickness the same as the thickness as the outer insulation 26.

The position of the conductive sleeve 155 and the inner crimp ring 150 may be fixed by using a crimping tool to crimp the crimping portion of the conductive sleeve 155 to the conductive shielding 24, the inner crimp ring 150 and the inner insulation 22. The position of the conductive sleeve 155 may also be fixed by friction force between the conductive sleeve 155 and the inner insulation 22. In other aspects, in an epoxy or adhesive may be used to fix the position of the conductive sleeve 155.

A spring contact 160 is positioned around the conductive sleeve 155. For example, the spring contact 160 surrounds another portion of the conductive sleeve. In an aspect of the disclosure, the another portion of the conductive sleeve is substantially flat to enable the spring contact 160 to be flush with the external surface of the another portion of the conductive sleeve. This maximizes the surface area of the contact between the spring contact 160 and the conductive sleeve.

The spring contact 160 and the conductive sleeve 155 may be made of a conductive material such as copper or aluminum. In an aspect of the disclosure, the spring contact 160 and the conductive sleeve 155 may be made of the same conductive material. In an aspect of the disclosure, the spring contact 160 may be made of a metal with a spring constant within a predetermined range. For example, the metal may be beryllium copper.

In the example cable 10 illustrated in FIG. 8A, instead of the ring terminal 64 being used for connecting with a terminal (busbar) in either the inverter 15 or electric machine 15, the cable may have a pin contact 170. The pin contact 170 may be crimped onto the main conductor 20 in a similar manner as described above. The shrinkwrap sleeve 165 may be used to cover the pin contact 170 and an exposed portion of the main conductor 20 around the point of crimping.

The folding of the conductive shielding 24, the inner crimp ring and the conductive sleeve 155 are positioned at predetermined distances from the end of main conductor 20 or the pin contact 170, such that when the cable 10 is inserted into the cable connector chassis 1, the spring contact 160 may be positioned within the shield termination tube 105 while the pin contact 170 is positioned at a predetermined position within the cable connector chassis 1 (set distance to connect with the terminal (busbar) of either the inverter 15 or the electric machine 5).

FIG. 7 shows the spring contact 160 positioned within the shield termination tube 105. The spring force of the spring contact 160 on the shield termination tube 105 maintains the position of the conductive sleeve 155 in the shield termination tube 105.

According to these aspects of the disclosure, the electrical connection (series) between the capacitors 110 on the PCB and the conductive shielding 24 is via the shield termination tube 105, the spring contact 160 and the conductive sleeve 155.

The same cable connector chassis 1 is configured to accept the electrical connection either as shown in FIG. 4B (outer surface of the shield termination tube) or as shown in FIG. 7 (inner surface of the shield termination tube).

While FIGS. 6 and 7 illustrate the protection insulators 115 covering the capacitors 110 on the PCB 100, the protection insulators 115 may be omitted because the strands of the conductive shielding 24 are not near the PCB 100 and the likelihood of the strands damaging the PCB 100 (and/or capacitors 110) is low. As shown in FIG. 7, the folded back conductive shielding 24 is positioned within a wall of the cable connector chassis 1 when the cable 10 is inserted at a target position. However, the protection insulators 115 may be optionally used.

Once the cable 10 is at the target position, the components of the cable strain relief (with scaling gland) (assembly 62) are threaded together to secure the cable position (secure the cable 10 to the chassis 1). For example, the dome end cap is threaded onto the feedthrough.

Figure 9:
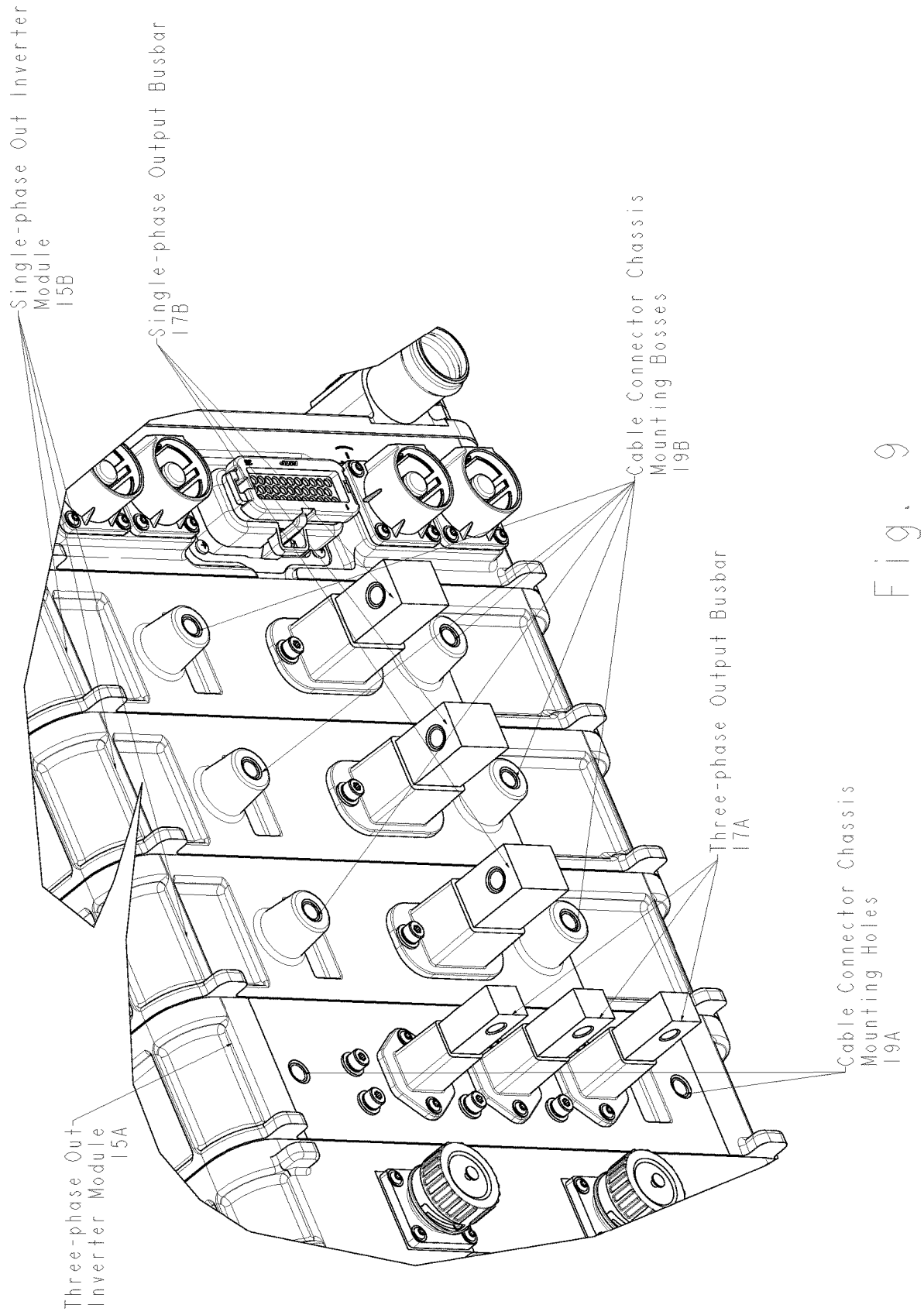
FIG. 9 illustrates an example of connection terminals/bosses of a plurality of different inverter modules in accordance with aspects of the disclosure.

An inverter 15 described herein may be included in an inverter module. Each inverter module may comprise a DC busbar, pairs of semiconductor switches described above and a module chassis. DC power may be supplied to the DC busbar via a common backplane between the inverter modules. In some aspects of the disclosure, the inverter module may be a three-phase out inverter module 15A. For example, three pairs of semiconductors switches may independently output three phases. Each phase may be output by a separate terminal. FIG. 9 illustrates an example of the three output terminals (three-phase output busbar 17A) for a three-phase out inverter module 15A. As illustrated in FIG. 9, the busbars 17A project from the inverter module chassis (three from the same inverter module 15A). The module chassis may also comprise mounting openings such as cable connector chassis mounting holes 19A for mounting the cable connector chassis 1 to the inverter module 15A. As illustrated in FIG. 9, there are two mounting holes 19A; the mounting holes 19A correspond in position to the mounts on the cable connector chassis 1 and are for the mounting hardware 70 to be inserted therein.

FIG. 10A illustrates an example of a cable connector chassis 1 mounted to an inverter module 15A in accordance with aspects of the disclosure. The three-phase output busbar (s) 17A, projecting from the module chassis, may be connected to ring terminal 64 of each cable 10. The cable connector chassis 1 has openings 61 for each AC busbar. Phase busbar hardware 59 may electrically and mechanically connect the ring terminal(s) 64 with the three-phase output busbar(s) 17A. In an aspect of the disclosure, the phase busbar hardware may be a bolt and a washer.

The hardware 59 is torqued down into the corresponding openings to secure the ring terminal(s) 64 to the busbar(s) 17A (the hardware may also be threaded through a nutplate, not shown). Similarly, chassis mounting hardware 70 may be inserted into mounts in the cable connector chassis 1 and into the cable connector chassis mounting holes 19A and torqued down to secure the chassis 1 to the inverter module chassis. The chassis mounting hardware 70 may also be a bolt and a washer (the hardware may also be threaded through a nutplate, not shown).

The inverter module may be a single-phase out inverter module 15B. In a single-phase out inverter module 15B, a terminal (AC side) of each pair of semiconductor switches (in the half-bridge configuration) is connected in parallel to form a single-phase output. In this aspect of the disclosure, the inverter module 15B has a single terminal projecting from the module chassis such as illustrated in FIG. 9 (single-phase output busbar 17B).

Since the output of the pairs of switches is connected in parallel, the current that the busbar 17B may carry is higher than the current each individual three-phase output busbar 17A may carry. Therefore, the cross-sectional area of the single-phase output busbar 17B may be larger than the cross-sectional area of each three-phase output busbar 17A. In an aspect of the disclosure, the busbar opening in the cable connector chassis 1 may be different depending on whether the cable connector chassis 1 is being mounted to inverter module 15A versus inverter module 15B (both in size and shape).

In an aspect of the disclosure, the same cable connector chassis 1 may be connected to three single-phase out inverter modules 15B (where the cable connector chassis 1 has three cables 10). In an aspect of the disclosure, the dimensions of the cable connector chassis 1 may be different depending on whether the chassis 1 is being mounting to inverter module 15A versus inverter module 15B.

FIG. 10B illustrates an example of a cable connector chassis 1 mounted on three single-phase out inverter modules 15B. The cable connector chassis 1 has three AC busbar openings 60 (instead of busbar openings 61). These openings are bigger. In an aspect of the disclosure, instead of cable connector chassis mounting holes 19A, the inverter modules 15B may have cable connector chassis mounting bosses 19B.

The chassis mounting hardware 70 may be inserted into the mounts in the cable connector chassis 1 and the mounting bosses 19B and torqued down to secure the chassis 1 to the chassis of a plurality of the single-phase out inverter modules 15B. The electrical and mechanical connection between the busbars 19B and the ring terminals 64 is the same as described above (via phase busbar hardware 59).

The mountings in FIG. 10A and FIG. 10B are shown for example purposes only and the number of cables in the cable connector chassis 1 may be more or less than three. The number of single-phase out inverter modules 15B that the chassis 1 is mounted to may be based on the number of cables 10 within the chassis 1. For example, separate cable connector chassis 1 may be used for each cable. In an aspect of the disclosure, three separate cable connector chassis 1 may be mounted to the three-phase out inverter module 15A. Additionally, in an aspect of the disclosure, one cable connector chassis 1 may be mounted to each single-phase out inverter module 15. In other aspects of the disclosure, each cable connector chassis 1 may have six cables and the inverter module may be a six-phase out inverter module.

In an aspect of the disclosure, a power system may have both the three-phase out inverter module 15A and single-phase out inverter module(s) 15B as illustrated in FIG. 11, where cable connector chassis 1 is respectively mounted to both types of inverter modules. The power system may be a modular power control system (MPCS). A MPCS is a modular line replaceable unit (LRU) containing a plurality of inverters modules and high voltage power distribution. The MPCS is scalable and customizable to have any number of inverters modules and current interfaces.

FIGS. 10A, 10B and 11 illustrate example of the electrical and mechanical connection of the cable to the busbars 17A, 17B via ring terminal 64; however, as described herein the connection may be achieved using pin contact 170.

In FIGS. 4A, 4B, 6, 7, 8A, 10A, 10B and 11 only a section of the cable 10 is shown for descriptive purposes. In practice, the cable 10 will extend past the section shown.

In FIGS. 3, 4A, 6, 10A, 10B and 11, the cover for the chassis 1 is not shown, however, in practice, the chassis 1 has a cover on the top such that the interior of the chassis 1 is sealed. In FIGS. 3, 4A, 4B, 6, 7, 10A, 10B, and 11, the mounting hardware for the cover is shown where the cover would be mounted.

In aspect of the disclosure, the capacitance used in the high pass filter (both total value and number of capacitors 110) may be different depending on whether the cable connector chassis 1 is mounted to the three-phase out inverter module 15A or single-phase out inverter modules 15B.

In other aspects, the capacitance used the high pass filter (both total value and number of capacitors 110) may be different depending on whether the high pass filter is used on both ends of the cable 10.

The conductive sleeve 155 is an example of an intermediary conductor.

In the discussion and claims herein, the term "about" indicates that the value listed may be somewhat altered, as long as the alteration does not result in nonconformance of the process or device. For example, for some elements the term "about" can refer to a variation of ±0.1%, for other elements, the term "about" can refer to a variation of ±1% or ±10%, or any point therein. For example, the term about when used for a measurement in mm, may include +/0.1, 0.2, 0.3, etc., where the difference between the stated number may be larger when the state number is larger. For example, about 1.5 may include 1.2-1.8, where about 20, may include 18.0-22.0.

As used herein, the term "substantially", or "substantial", is equally applicable when used in a negative connotation to refer to the complete or near complete lack of an action, characteristic, property, state, structure, item, or result. For example, a surface that is "substantially" flat would either completely flat, or so nearly flat that the effect would be the same as if it were completely flat. "Substantially" when referring to a shape or size may account for manufacturing where a perfect shapes, such as circular or sizes may be difficult to manufacture.

As used herein terms such as "a", "an" and "the" are not intended to refer to only a singular entity, but include the general class of which a specific example may be used for illustration. As used herein, terms defined in the singular are intended to include those terms defined in the plural and vice versa.

References in the specification to "one aspect", "certain aspects", "some aspects" or "an aspect", indicate that the aspect(s) described may include a particular feature or characteristic, but every aspect may not necessarily include the particular feature, structure, or characteristic. Moreover, such phrases are not necessarily referring to the same aspect. Further, when a particular feature, structure, or characteristic is described in connection with an aspect, it is submitted that it is within the knowledge of one skilled in the art to affect such feature, structure, or characteristic in connection with other aspects whether or not explicitly described.

For purposes of the description hereinafter, the terms "upper", "lower", "right", "left", "vertical", "horizontal", "top", "bottom", and derivatives thereof shall relate to a device relative to a floor and/or as it is oriented in the figures or with respect to a surface.

Reference herein to any numerical range expressly includes each numerical value (including fractional numbers and whole numbers) encompassed by that range. To illustrate, reference herein to a range of "at least 50" or "at least about 50" includes whole numbers of 50, 51, 52, 53, 54, 55, 56, 57, 58, 59, 60, etc., and fractional numbers 50.1, 50.2 50.3, 50.4, 50.5, 50.6, 50.7, 50.8, 50.9, etc. In a further illustration, reference herein to a range of "less than 50" or "less than about 50" includes whole numbers 49, 48, 47, 46, 45, 44, 43, 42, 41, 40, etc., and fractional numbers 49.9, 49.8, 49.7, 49.6, 49.5, 49.4, 49.3, 49.2, 49.1, 49.0, etc.

The terminology used herein is for the purpose of describing particular embodiments only and is not intended to be limiting the scope of the disclosure and is not intended to be exhaustive. Many modifications and variations will be apparent to those of ordinary skill in the art without departing from the scope and spirit of the disclosure.

What is claimed:

1. A cabling system comprising:
  a cable connectable at a first end with an electric machine and an inverter at a second end, the cable having a conductor, a first insulator surrounding the conductor, a conductive shielding and a second insulator surrounding the conductive shielding, where the conductor and the conductive shielding is exposed at the first end and the second end, wherein the conductive shielding connectable to a chassis of the inverter and a chassis of the electric machine;
  a high pass filter comprising capacitance electrically connected to the conductive shielding configured to attenuated current less than a predetermined frequency from coupling to the conductive shielding, the attenuation being achieved via a frequency dependent current limiting impedance of the capacitance;
  wherein a resonant frequency of the capacitance is greater than a frequency of a common mode current caused by switching of semiconductor switches in the inverter and a first N harmonics, where N is number of harmonics having an RMS greater than a preset amplitude.

2. The cabling system of claim 1, wherein the capacitance is provided by a plurality of capacitors connected in parallel.

3. The cabling system of claim 1, wherein the frequency dependent current limiting impedance of the capacitance at the frequency of the common mode current and the first N harmonics is less than an impedance of any conductor that is in parallel to the conductive shielding.

4. The cabling system of claim 1, wherein the capacitance is arranged symmetrically around the conductive shielding.

5. The cabling system of claim 4, wherein the capacitance is connected at the first end.

6. The cabling system of claim 1, wherein current less than the predetermined frequency is caused by torque producing current and/or flux modifying current.

7. A cable connector chassis comprising:
  at least one opening configured and dimensioned to receive a cable, respectively, each cable comprising a conductor, a first insulator surrounding the conductor, a conductive shielding and a second insulator surrounding the conductive shielding, each cable extending between a first end and a second end, the first end being insertable in one of the at least one opening, the conductor and the conductive shielding being exposed from the first insulator and the second insulator at the first end,
  a printed circuit board (PCB) with at least one circuit board opening, each circuit board opening being aligned with a corresponding opening in the cable connector chassis;
  at least one a shield termination tube connected to the PCB, each shield termination tube having a opening, align with the circuit board opening and the opening in the cable connector chassis, respectively,
  the PCB comprising at least one capacitor set, where capacitors within a set are parallelly connected, the conductive shielding of the cable positioned to connect a respective shield termination tube and electrically connect to a respective capacitor set forming a series connection, wherein each capacitor set forming a high pass filter configured to attenuated current less than a predetermined frequency from coupling to the conductive shielding, the attenuation being achieved via a frequency dependent current limiting impedance of the capacitor set.

8. The cable connector chassis of claim 7, wherein a resonant frequency of each capacitor set is greater than a frequency of a common mode current caused by switching of switches in the inverter and a first N harmonics, where N is number of harmonics having an RMS greater than a preset amplitude.

9. The cable connector chassis of claim 8, wherein the at least one opening in the cable connector chassis is three openings and there are three cables insertable into the cable connector chassis, each cable being a single phase cable and the at least one capacitor set is three capacitor sets, each capacitor set respectively electrically connected to the conductive shielding of a respective cable.

10. The cable connector chassis of claim 9, wherein the conductive shielding is folded back over a respective shield termination tube to connect the conductive shielding to the shield termination tube and electrically connect to the respective capacitor set, wherein a clamp ring is positioned around the conductive shielding to fix the conductive shielding in place.

11. The cable connector chassis of claim 8, wherein capacitors in each set are arranged symmetrically around the respective conductive shielding.

12. The cable connector chassis of claim 10, further comprising an insulating layer between the conductive shielding and the PCB.

13. The cable connector chassis of claim 8, further comprising mounts configured to receive mounting hardware for mounting the cable connector chassis to an inverter chassis or an electric machine chassis, wherein when mounted, the conductor of each cable is connected in the cable connector chassis to a respective terminal of the inverter or the electric machine.

14. The cable connector chassis of claim 13, wherein the cable connector chassis is connectable to a plurality of single-phase out inverter modules.

15. The cable connector chassis of claim 13, wherein the cable connector chassis is connectable to a three-phase out inverter module.

16. The cable connector chassis of claim 8, wherein the conductive shielding is electrically connected to a respective shield termination tube via one or more intermediary conductors.

17. The cable connector chassis of claim 16, wherein the conductive shielding is folded back over a crimp ring positioned between a respective conductive shielding and a respective second insulator, a respective intermediary conductor is positioned on the respective conductive shielding, and a respective contact spring is positioned on the respective intermediary conductor, wherein the respective contact spring contacts an interior of the respective shield termination tube to make an electrical connection between the respective conductive shielding and the respective shield termination tube.

18. The cable connector chassis of claim 7, wherein current less than the predetermined frequency is caused by torque producing current and/or flux modifying current.

19. The cable connector chassis of claim 9, wherein the predetermined frequency is 1000 Hz.

* * * * *